United States Patent
Sohier et al.

(10) Patent No.: US 12,488,214 B2
(45) Date of Patent: Dec. 2, 2025

(54) METHOD FOR DETECTING AN ATTACK BY ELECTROMAGNETIC WAVES OF A CHIP OR A SYSTEM-IN-PACKAGE BASED ON THE GMI EFFECT

(71) Applicant: COMMISSARIAT A L'ENERGIE ATOMIQUE ET AUX ENERGIES, Paris (FR)

(72) Inventors: Thibaut Sohier, Grenoble (FR); Stéphan Borel, Grenoble (FR); Jean-Philippe Michel, Grenoble (FR)

(73) Assignee: COMMISSARIAT A L'ENERGIE ATOMIQUE ET AUX ENERGIES, Paris (FR)

( * ) Notice: Subject to any disclaimer, the term of this patent is extended or adjusted under 35 U.S.C. 154(b) by 203 days.

(21) Appl. No.: 18/346,644

(22) Filed: Jul. 3, 2023

(65) Prior Publication Data
US 2024/0013022 A1 Jan. 11, 2024

(30) Foreign Application Priority Data
Jul. 5, 2022 (FR) .................................... 22 06850

(51) Int. Cl.
*G06K 19/073* (2006.01)
(52) U.S. Cl.
CPC . *G06K 19/07372* (2013.01); *G06K 19/07336* (2013.01)
(58) Field of Classification Search
CPC ........ G06K 19/07372; G06K 19/07336; H01L 23/57
See application file for complete search history.

(56) References Cited

U.S. PATENT DOCUMENTS 11,978,708 B2 * 5/2024 Sohier .................... G06F 21/87
2008/0088996 A1 * 4/2008 Bonvalot ............. G06K 19/073
257/E27.012
(Continued)

FOREIGN PATENT DOCUMENTS

FR 3 111 737 A1 12/2021

OTHER PUBLICATIONS

French Search Report & Written Opinion issued Feb. 22, 2023 in FR 22 06850 filed on Jul. 5, 2022, 9 pages (with English Translation of Categories of Cited Documents).
(Continued)

*Primary Examiner* — Mohamed A. Wasel
(74) *Attorney, Agent, or Firm* — Oblon, McClelland, Maier & Neustadt, L.L.P.

(57) ABSTRACT

A method is provided for detecting an attack by electromagnetic waves on an electronic chip or system-in-package type device including an attack detection element comprising a GMI-effect electrically-conductive material. The method includes demagnetising the GMI-effect material such that the value of its remanent magnetisation is equal to a predefined value lower than the value of its maximum remanent magnetisation. The method further includes determining a first value of the impedance of the attack detection element, and then after a time period during which the device might have undergone an attack, measuring a second value of the impedance of the attack detection element by circulating in the GMI-effect electrically-conductive material an alternating current with the same frequency as when determining the first impedance value. The method also includes comparing the first and second values of the impedance of the attack detection element.

9 Claims, 3 Drawing Sheets

(56) References Cited

U.S. PATENT DOCUMENTS

| | | | |
|---|---|---|---|
| 2013/0249029 A1* | 9/2013 | Vig | G01D 5/147 |
| | | | 257/427 |
| 2019/0237726 A1* | 8/2019 | Dubois | H02H 7/00 |
| 2021/0328761 A1* | 10/2021 | Guilley | G06F 11/1044 |
| 2021/0398918 A1* | 12/2021 | Sohier | H01L 23/576 |
| 2022/0237334 A1* | 7/2022 | Gaine | G06F 21/87 |

OTHER PUBLICATIONS

Borel et al. "Systems Secured by Packing using a GMI Structure" 2021 Smart Systems Integration (SSI) IEEE, Apr. 27, 2021 4 pages.

* cited by examiner

METHOD FOR DETECTING AN ATTACK BY ELECTROMAGNETIC WAVES OF A CHIP OR A SYSTEM-IN-PACKAGE BASED ON THE GMI EFFECT

TECHNICAL FIELD

The invention relates to the field of protection of electronic chips and electronic system-in-packages, or SiP ("System in Package") against physical attacks.

PRIOR ART

In general, attacks that a chip or a SiP could undergo aim to disturb the operation of a system or access confidential data stored in the memory of an electronic circuit of the chip or of the SiP. A chip or a SiP may be attacked by software or hardware. In the second case, the attacks, so-called physical, may be done in various manners: chemical, laser, electromagnetic, electrical, etc.

Attacks by electromagnetic waves, which consist in carrying an injection of faults in the components (for example the transistors) of the circuits of the attacked chip or SiP via electromagnetic pulses emitted by a coil of an attack probe, are dangerous because they are generally quite effective. The electromagnetic waves are emitted by the coil of the attack probe in the form of shots with a duration equal to a few nanoseconds, which generates disturbing eddy currents in the metallisation lines of the attacked circuit. These eddy currents cause the change of state of some transistors and generate errors in the operations executed in the attacked circuit, which allows bypassing the cryptographic securities set up in this circuit. In the case where these operations correspond to encryption/decryption operations, it is possible, by analysing the erroneous values generated by the circuit, to find information relating to the encryption key (i.e. the value of the bits that form it) used by the attacked circuit.

To protect against such attacks, it is possible to use one or more detection coil(s) disposed on the chip or the SiP. These detection coils are used within oscillating circuits and detect these attacks thanks to the coupling that occur between them and the coil of the attack probe because when the coil of the attack probe emits electromagnetic waves, the oscillation frequency of the oscillators including the detection coils is then modified. The attacks are detected by measurement of this variation of the oscillation frequency of these oscillators.

Nonetheless, the use of such detection coils ensures detection only while these attacks are happening.

DISCLOSURE OF THE INVENTION

The present invention aims to provide a method allowing detecting a posteriori and reliably attacks by electromagnetic waves that have been perpetrated on an electronic chip or an electronic system-in-package.

For this purpose, the invention provides a method for detecting an attack by electromagnetic waves on an electronic chip or system-in-package type device including at least one attack detection element, said attack detection element including at least one giant magneto-impedance, GMI, effect electrically-conductive material, including at least the following steps:

a) demagnetising the GMI-effect electrically-conductive material such that the value of its remanent magnetisation is equal to a predefined value lower than the value of its maximum remanent magnetisation, b) determining a first value of the impedance of the attack detection element for a given value of the frequency of an alternating current circulating in the GMI-effect electrically-conductive material, then c) after a time period during which the device might have undergone an attack by electromagnetic waves, measuring a second value of the impedance of the attack detection element by circulating in the GMI-effect electrically-conductive material an alternating current with a frequency equal to said given value, d) comparing the first and second values of the impedance of the attack detection element, the device being considered as having undergone an attack by electromagnetic waves when the first and second values of the impedance of the attack detection element are significantly different from each other.

In this method, it is suggested to set at first an initial state of the remanent magnetisation of a GMI-effect electrically-conductive material at a level lower than the maximum remanent magnetisation that could be reached by this material. Thus, any attack by electromagnetic waves perpetrated on the device will cause a substantial and durable reorientation of some Weiss domains of the GMI-effect electrically-conductive material, thereby modifying its remanent magnetisation and therefore also its impedance. Thanks to the impedance measurements carried out before and after a given time period during which the device might undergo an attack, it therefore becomes possible to reliably determine whether the device has undergone an attack by electromagnetic waves.

One of the advantages provided by the GMI effect is that a significant variation of the impedance of the attack detection element of the device is obtained in a durable manner even when the magnetisation of this element barely varies.

The obtained GMI effect corresponds to a durable modification of the magnetisation of the electrically-conductive material having such an effect, when it is subjected to an external magnetic field which depends on the used material and which is for example in the range of 1 Oe or 80 A/m, or comprised between about 1 Oe and 100 Oe (namely 0.1 mT and 10 mT) which could be advantageously used during an a posteriori measurement of its impedance. The magnetisation may be considered as being durably modified when its value does not change until it is modified again by magnetisation or demagnetisation.

For example, the amplitude of the alternating current used during the impedance measurements is comprised between 5 mA and 300 mA, or between 10 mA and 300 mA, or between 20 mA and 300 mA, and its frequency is for example in the range of a few kHz up to several GHz, for example comprised between 1 kHz and 10 GHz.

The first and second values of the impedance of the attack detection element may be considered as being significantly different from each other when the second value differs by at least 5% with respect to the first value.

An electronic system-in-package, or SiP, corresponds to a set of electronic chips, integrated circuits or other components (passive, MEMS, etc. . . . ) enclosed in the same package or module, these chips being disposed next to one another and/or on top of one another, over a support, and electrically connected to each other and to connections external to the package by wires and/or by a flip-chip.

The GMI-effect electrically-conductive magnetic material may correspond to a material the following properties:

it is a soft ferromagnetic, i.e. which can be easily magnetised, with a narrow hysteresis cycle and a coercive field Hc lower than or equal to 10 Oe;

whose relative magnetic permeability is higher than or equal to 10.

Step a) may be implemented by circulating in the GMI-effect electrically-conductive material an alternating excitation current whose amplitude progressively decreases over time or by subjecting the GMI-effect electrically-conductive material to a magnetic excitation field whose amplitude progressively decreases over time, until the value of the remanent magnetisation of the GMI-effect electrically-conductive material is equal to the predefined value.

In a first configuration, the predefined value may be equal to the value of the minimum remanent magnetisation of the GMI-effect electrically-conductive material. One of the advantages of such an implementation of the method is that the least modification of the magnetisation of the GMI-effect electrically-conductive material is then detected, which allows having the highest possible sensitivity to detect the potential attacks by electromagnetic waves.

In a first configuration, the predefined value may be higher than the value of the minimum remanent magnetisation of the GMI-effect electrically-conductive material.

One of the advantages of such an implementation of the method is that given the unknown nature of the predefined value for an attacker, it is not possible for this attacker to carry out, after one attack, a demagnetisation of the GMI-effect electrically-conductive material in order to recover this material in its initial state.

The GMI-effect electrically-conductive material may be a soft ferromagnetic material. The detection element may form a sensor located at a portion of a face of the device.

In this case, the device may further include at least one element for protecting said face of the device, said protective element being disposed in the device and comprising at least one other GMI-effect electrically-conductive material portion (which may be similar, or not, to the GMI-effect electrically-conductive material of the attack detection element) extending, in a plane parallel to said face of the device, according to at least one serpentine and/or spiral like pattern.

Thus, the detection element may correspond to a GMI sensor with dimensions smaller than the area to be protected and which may herein be associated with a protective element which may occupy the entirety of the surface of the device to be protected and form a protective screen, for example from a laser attack but which, in the case of an attack by electromagnetic waves, could have a portion of its length magnetised and thus inform the GMI sensor on an attack, even a posteriori.

This protective element may be disposed opposite a region of the device to be protected so that an attack cannot be implemented without removing or modifying this protective element to be able to access this region of the device. In particular, some attacks could irreversibly modify the impedance of the protective element, making the recovery of this impedance value impossible after the attack.

Hence, the protective element of the device allows detecting a modification of the electromagnetic environment of the device, conferring a good protection of the device in particular from electromagnetic attacks, as well as any modification of the structure of the protective element, conferring a good protection of the device from laser attacks or other attacks requiring an access to the component. Furthermore, the materials used to form the protective element act as a shield, or shielding, against electromagnetic waves, which contributes to protecting the device.

The device may further include at least one second attack detection element of the device comprising at least one second GMI-effect electrically-conductive material (which may be similar, or not, to the GMI-effect electrically-conductive material of the other attack detection element), and wherein steps a), b), c) and d) of the method are also implemented for the second attack detection element. Since each attack detection element could have a limited detection region, having several attack detection element could allow covering the entirety of the surface to be protected of the device.

The first and second attack detection elements may be disposed over the same face of the device.

The device may include a memory, an FPGA ("Field Programmable Gate Array") or an ASIC ("Application-Specific Integrated Circuit") comprising for example a processor as well as other components such as passive components, sensors, etc.

The device may include an encapsulation material covering at least the attack detection element of the device, and/or covering the protective element.

The GMI-effect electrically-conductive material may correspond to a metal, or a metal alloy, comprising at least one of the following elements: Fe, Ni, Co.

The device may further include:
a device for reading the impedance of the attack detection element of the device;
a memory in which the first value of the impedance of the attack detection element of the device is intended to be stored.

An alternating current source may be electrically coupled to the attach detection element of the device. This current source may be external to the device.

BRIEF DESCRIPTION OF THE DRAWINGS

The present invention will be better understood upon reading the description of embodiments given for merely indicative and non-liming purposes with reference to the appended drawings wherein.

Identical, similar or equivalent portions of the different figures described hereinafter bear the same reference numerals so as to facilitate switching from one figure to another.

The different portions shown in the figures are not necessarily plotted according to a uniform scale, to make the figures more readable.

The different possibilities (alternatives and embodiments) must be understood as not being mutually exclusive and can be combined with one another.

DETAILED DISCLOSURE OF PARTICULAR EMBODIMENTS

Figure 1:
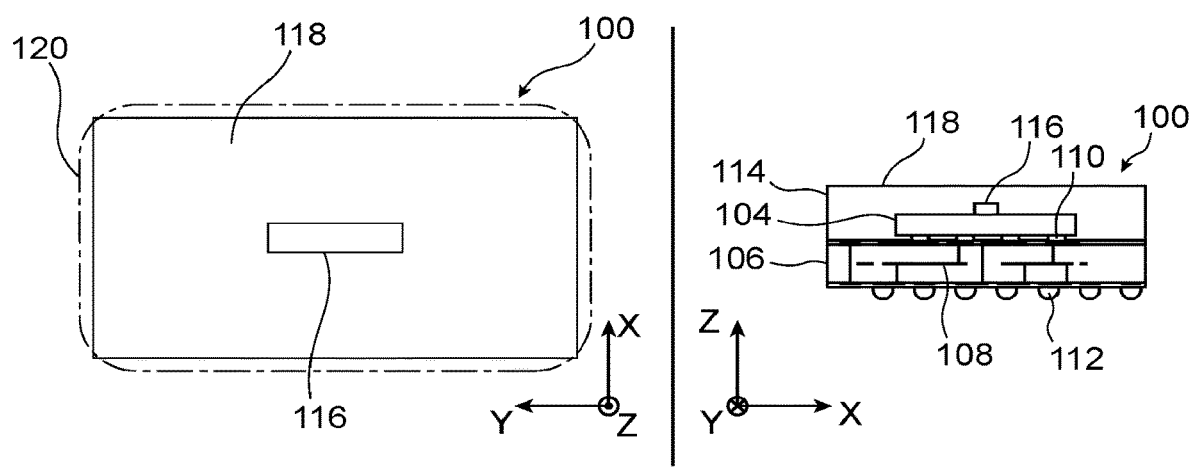
FIG. 1 schematically illustrates a first embodiment of a device including an attack detection element with which a method for detecting an attack by electromagnetic waves, object of the present invention, is implemented.

FIG. 1 schematically shows an embodiment of a device 100 provided with at least one attack detection element with which a method for detecting an attack by electromagnetic waves is implemented. In FIG. 1, the view to the left corresponds to a top view of the device 100, and the view to the right corresponds to a sectional view of the device 100.

The device 100 herein corresponds to an electronic system-in-package, or SiP. The device 100 includes one or more chip(s) 104 (one single chip 104 is shown in the example of FIG. 1) and a support 106 on which the chip(s) 104 is/are mechanically or electrically coupled. The device 100 may also include other electronic components disposed over the support 106. The support 106 forms the rear face of the device 100. For example, the support 106 corresponds to an organic or ceramic or metallic substrate.

The device 100 also includes one or more redistribution metal layers 108 (or RDL standing for "Redistribution Layer") disposed over and/or in the support 106 and to which electrical connections 110, corresponding for example to microbeads, of the chip(s) 104 are mechanically and electrically coupled (flip chip type coupling in the example of FIG. 1; coupling by wiring is also possible). Some portions of the redistribution metal layer 108 are electrically connected, through the support 106, to connection pins 112 of the device 100 which correspond for example to connection beads. One or more other portion(s) of the redistribution metal layer 108 may electrically connect electrical connection connections 110 together. For example, the redistribution metal layer 108 includes one of the following materials: Cu, Au, Al.

The device 100 also includes an encapsulation material 114 surrounding the chip 104. In particular, this encapsulation material 114 is intended to mechanically protect the chip 104. For example, the encapsulation material 114 includes an epoxy resin loaded with silica beads.

The device 100 includes an attack detection element 116 of the device 100 which, in the example of FIG. 1, is disposed over the chip 104, on the side opposite to that where the connection pins 112 are located and electrically connected to the substrate 106 in order to transmit the information according to which an attack has been carried out or not. The encapsulation material 114 also encloses the element 116, and the encapsulation material is present between the element 116 and the chip 104. This element 116 includes at least one GMI-effect electrically-conductive material. In the embodiment described with reference to FIG. 1, the element 116 includes a GMI-effect electrically-conductive material portion forming a sensor located at a portion of a face 118 of the device 100 which herein corresponds to the upper face of the device 100 which is opposite to that where the connection pins 112 are located. In the view to the left of FIG. 1, a region 120 delimited by dotted lines symbolically represents the sensitivity area of the element 116, i.e. the area in which electromagnetic waves related to an attack of the device 100 could affect the element 116 and therefore be detected.

According to one embodiment, the electrically-conductive material having a GMI effect of the element 116 corresponds to a soft ferromagnetic material, such as a metal or a metal alloy including at least one of the following elements: Fe, Ni, Co, and for example NiFe and/or CoTaZr. The material of the element 116 may also correspond to a conductive polymer or to a conductive carbon.

During a first step a), the GMI-effect electrically-conductive material of the element 116 is demagnetised so that the value of the remanent magnetisation of this material, i.e. its magnetisation when it is not subjected to an external magnetic field, is equal to a predefined value lower than the value of the maximum remanent magnetisation of this material.

Figure 2:
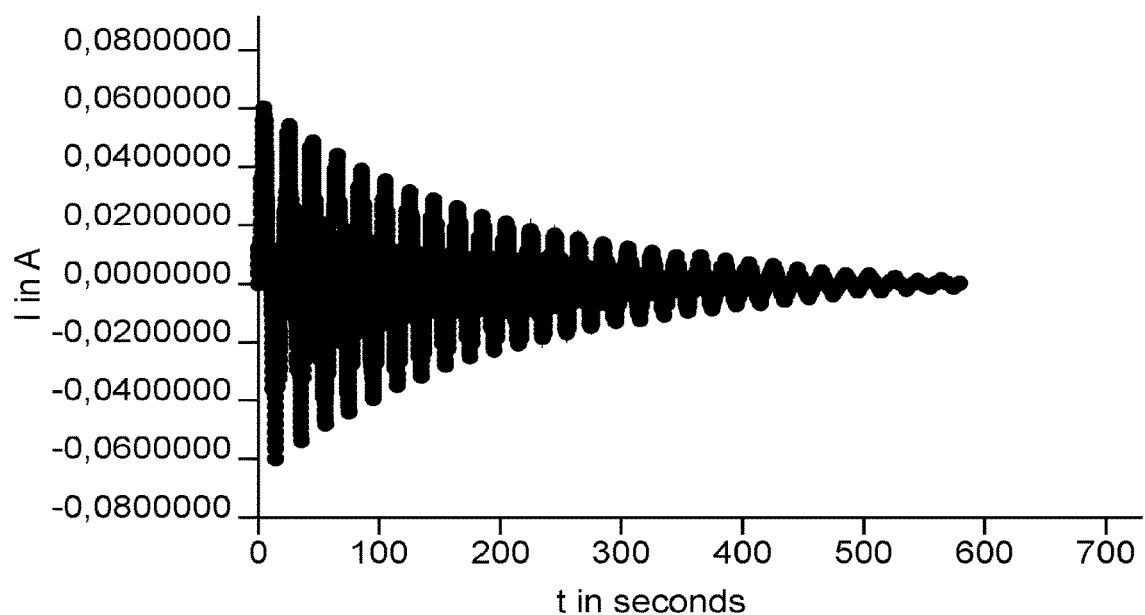
FIG. 2 schematically illustrates n example of an excitation current applied on a GMI-effect electrically-conductive material during a demagnetisation of this material.

To carry out this demagnetisation, it is possible for example to circulate in the GMI-effect electrically-conductive material of the element 116 an excitation alternating current whose amplitude progressively decreases over time or to subject the GMI-effect electrically-conductive material to a magnetic excitation field whose amplitude progressively decreases over time, until the value of the remanent magnetisation of the GMI-effect electrically-conductive material is equal to said predefined value. FIG. 2 schematically shows an example of evolution of the amplitude over time of such an excitation current circulating in the GMI-effect electrically-conductive material of the element 116 during such a demagnetisation of this material. When the demagnetisation is carried out using an excitation magnetic field, the shape of the signal representing the evolution of the amplitude of this excitation magnetic field over time may be substantially similar to that of the signal shown in FIG. 2.

Figure 3:
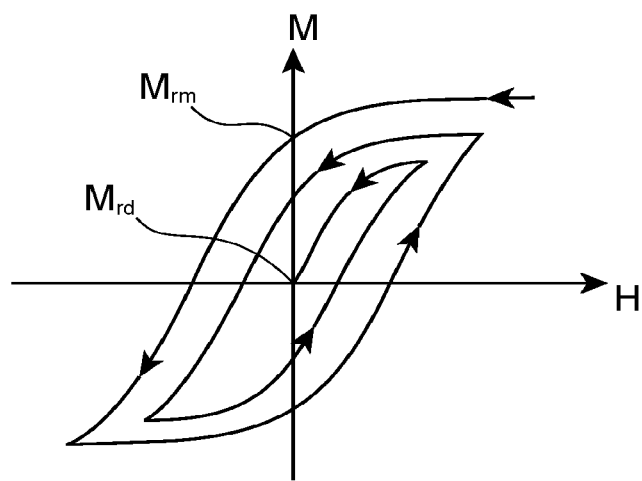
FIG. 3 shows an example of a variation of the value of the magnetisation of a GMI-effect electrically-conductive material when the latter is subjected to an excitation current, or field, during a demagnetisation of this material.

FIG. 3 shows the variation of the value of the magnetisation of the GMI-effect electrically-conductive material of the element 116 when the latter is subjected to an excitation current or an excitation magnetic field during this demagnetisation. The value $M_m$ corresponds to the value of the remanent magnetisation of the GMI-effect electrically-conductive material of the element 116 before the implementation of this demagnetisation step. The value $M_{rd}$ corresponds to the value of the remanent magnetisation of the GMI-effect electrically-conductive material of the element 116 after the implementation of this demagnetisation step.

In the embodiment described herein, this demagnetisation is implemented such that the value of the remanent magnetisation of the GMI-effect electrically-conductive material of the element 116 ($M_{rd}$ in FIG. 3) is equal to the value of the minimum remanent magnetisation of this material. In other words, the excitation current or the excitation magnetic field applied during this demagnetisation progressively decreases so as to progressively reduce the magnetisation of the GMI-effect electrically-conductive material of the element 116 until reaching the lowest possible value of this material. Alternatively, it is possible that the predefined value at which the remanent magnetisation of the GMI-effect electrically-conductive material of the element 116 is set is higher than the value of its minimum remanent magnetisation, but still lower than the value of its maximum remanent magnetisation. It is possible to select this remanent magnetisation value of the GMI-effect electrically-conductive material of the element 116 by stopping the application of the excitation current or the excitation magnetic field at the time point where the desired remanent magnetisation value is reached in this material.

After this demagnetisation step, a second step b) is implemented to determine a first value of the impedance of the element 116 for a given value of the frequency of an alternating current circulating in the GMI-effect electrically-conductive material of the element 116. For example, this step is carried out by measuring this impedance at the terminals of the GMI-effect electrically-conductive material portion of the element 116.

The determined impedance value may correspond to that of a real impedance or of a complex impedance.

After having determined the value of the impedance of the element 116 when the value of the remanent magnetisation of the GMI-effect electrically-conductive material is equal to the predefined value, the device 100 is ready to be used and/or stored for time period. During this time period, the device 100 could undergo an attack by electromagnetic waves.

After this time period, which could last several minutes, or several hours, or several days, or several months, and even several years, a third step c) of measuring the value of the impedance of the element 116 is implemented by circulating in the GMI-effect electrically-conductive material of the element 116 an alternating current with a frequency equal to that used during the previous step b). By comparing, afterwards, during a fourth step d), the two measured impedance values, the first one before the time period during which the device 100 could undergo an attack by electromagnetic waves and the second one after this duration, it is possible to determine whether the device 100 has undergone such an attack, or not, the device 100 being considered as having been attacked when the first and second values of the impedance of the detection element are significantly different from each other, i.e. for example with a difference by at least 5% of the second value with respect to the first value.

Figure 4:
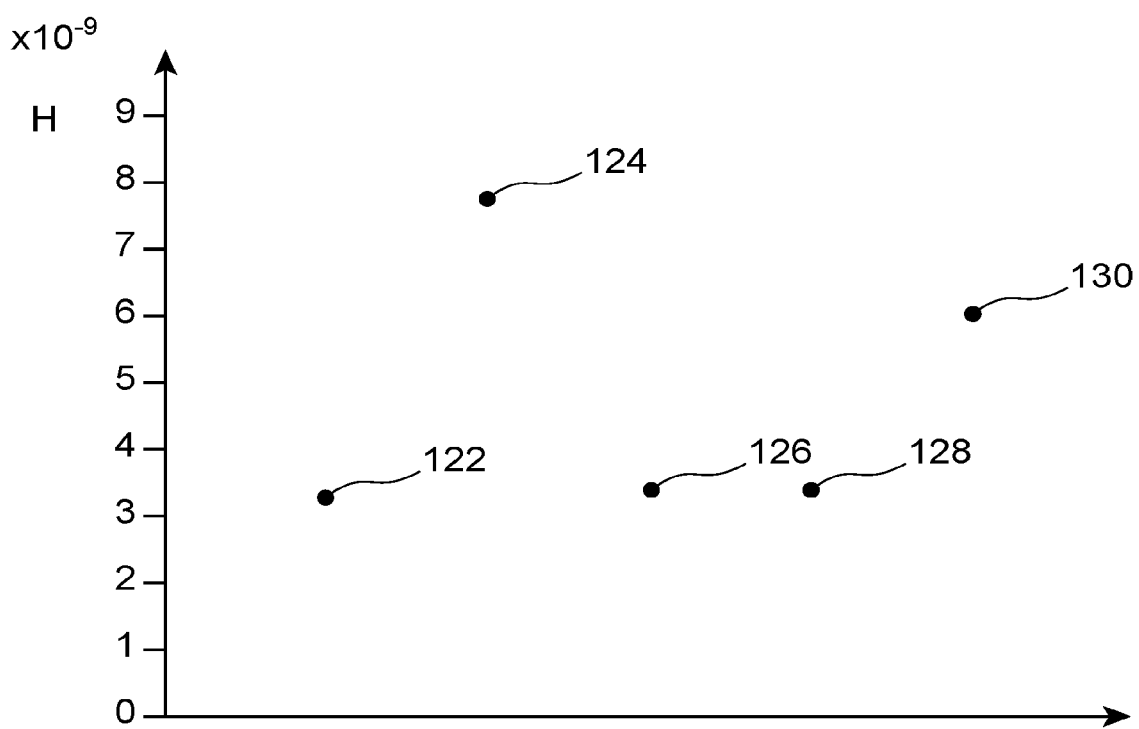
FIG. 4 shows measurements of the impedance of the attack detection element made for different magnetisation states of the GMI-effect electrically-conductive material of this element with which the method for detecting an attack by electromagnetic waves, object of the present invention, is implemented.

FIG. 4 shows measurements of the impedance of the element 116 made for different magnetisation states of the GMI-effect electrically-conductive material of the element 116.

The measurement 122 corresponds to the value of the initial inductance of the element 116 before it is demagnetised.

The measurement 124 shows the value of the inductance of the element 116 when the latter is fully magnetised.

The measurement 126 represents the value of the inductance of the element 116 after having undergone a demagnetisation such that the value of the remanent magnetisation of the GMI-effect electrically-conductive material of the element 116 is equal to the value of the minimum remanent magnetisation of this material.

The measurement 128 represents the value of the inductance of the element 116 after having undergone an attack by electromagnetic waves with a probe disposed at a distance equal to about 10 mm from the element 116. Such an attack does not allow carrying an injection of faults in the device because the probe is too far away from the device 100. The measurements 126 and 128 show such an attack does not significantly modify the magnetisation of the element 116 because the measured values are too close to each other.

The measurement 130 represents the value of the inductance of the element 116 after having undergone an attack by electromagnetic waves with a probe disposed at a distance equal to about 5 mm from the element 116. This measurement shows that such attacks, which could generate faults in the device 100, substantially modify the magnetisation of the element 116, and that these modifications are detectable afterwards by a measurement of the impedance of the element 116.

All these measurements are carried out by circulating in the GMI-effect electrically-conductive material of the element 116 a sinusoidal current with a frequency equal to 70 MHz.

For example, the frequency of the signal during the impedance measurement is comprised between 1 kHz and 10 GHz, and possibly between 70 MHz and 500 MHz. When the frequency of the signal is significant, for example higher than about 100 MHz, it is interesting to take account of the value of the resistance of the element 116 to determine whether the device 100 has undergone an attack. Otherwise, it is preferable to take account of the value of the inductance of the element 116 to determine whether the device 100 has undergone an attack.

Figure 5:
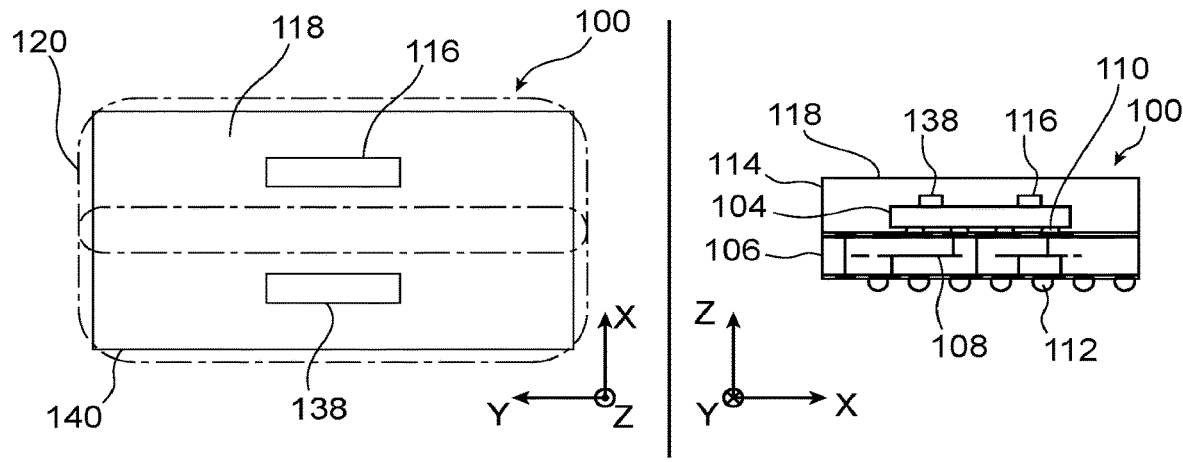
FIG. 5.

FIG. 5 schematically shows a second embodiment of a device 100 provided with at least one attack detection element with which a method for detecting an attack by electromagnetic waves is implemented.

In comparison with the device 100 described before with reference to FIG. 1, the device 100 shown in FIG. 5 includes, in addition with the first element 116, a second attack detection element 138 of the device 100. This second element 138 includes at least one GMI-effect electrically-conductive material portion, this material possibly being similar, or not, to that of the first element 116. In the view to the left of FIG. 5, a region 140 delimited by dotted lines symbolically represents the sensitivity area of the second element 138, i.e. the area in which electromagnetic waves related to an attack of the device 100 could affect the element 138 and therefore be detected. The regions 120 and 140 together cover the entirety of the face 118 of the device 100.

Figure 6:
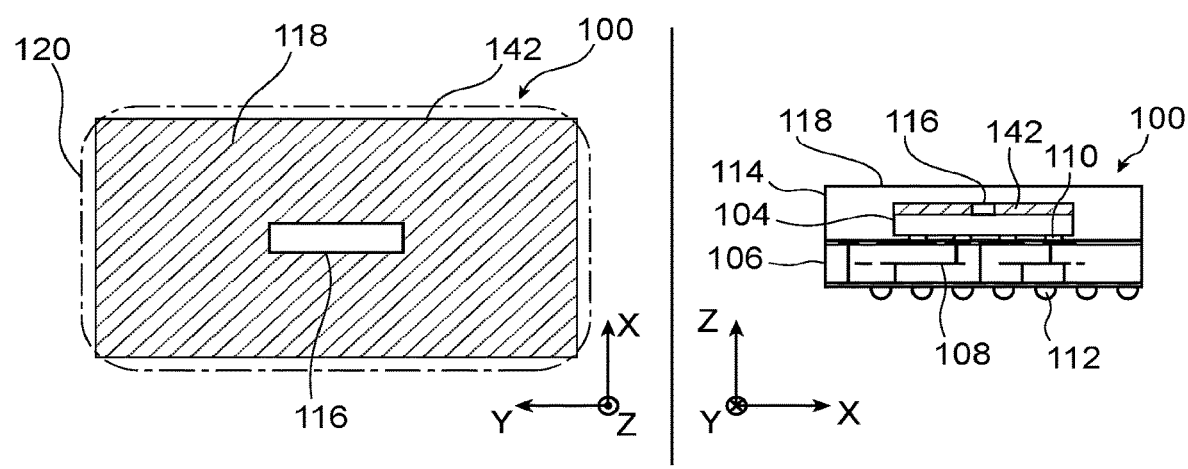
FIG. 6 schematically show second and third embodiments of a device including an attack detection element with which a method for detecting an attack by electromagnetic waves, object of the present invention, is implemented.

FIG. 6 schematically shows a third embodiment of a device 100 provided with at least one attack detection element with which a method for detecting an attack by electromagnetic waves is implemented.

In comparison with the device 100 described before with reference to FIG. 1, the device 100 shown in FIG. 6 includes, in addition with the first element 116, at least one element 142 for protecting at least one face 118 of the device 100. In FIG. 6, the protective element 142 is shown with hatches. In the embodiment shown in FIG. 6, the protective element 142 protects the entire surface of the chip 104 located on the side of the face 118 and is disposed above the chip 104, in the encapsulation material 114.

The protective element 142 includes an attack detection element of the device 100 including at least one GMI-effect electrically-conductive material.

In one embodiment, the protective element 142 may include electrically-connected portions of an electrically-conductive material having a GMI effect forming a protective layer located on the side of at least one of the faces of the chip 104 (on the side of the face 118 in the example shown in FIG. 6), thereby protecting the chip 104 from attacks conducted from the side of the device 100 at the level of which this protective element 142 is located. This protective element may extend on the side of the face 118, in a plane parallel to the face 118, according to a pattern of one or more serpentine(s), i.e. may include numerous portions connected together while forming bends and baffles in order to form a complex pattern and difficult to identify. Patterns other than one or more serpentine(s) are possible, like for example spiral-like patterns.

Numerous details and variants of the protective element 142 are described in the document FR 3 111 737 A1 and can be applied to make such a protective element 142 combined with the attack detection method according to the invention.

In all embodiments, the device 100 may include a device for reading the impedance of the attack detection element(s) 116, 138, 142 and a memory in which at least one reference value of the impedance of the or of each of these elements 116, 138, 142 is stored. An alternating current source external to the device 100 is electrically coupled to the detection elements 116, 138, 142 such that this current circulates in this or these element(s) 116, 138, 142 when measuring the impedance of this or these element(s) 116, 138, 142.

The invention claimed is:

1. A method for detecting an attack by electromagnetic waves on an electronic chip or system-in-package type device including at least one attack detection element of the device, said attack detection element including at least one giant magneto-impedance, GMI, effect electrically-conductive material, including at least the following steps:
   a) demagnetising the GMI-effect electrically-conductive material such that a value $M_{rd}$ of its remanent magnetisation is equal to a predefined value lower than the value of its maximum remanent magnetisation,
   b) determining a first value of the impedance of the attack detection element for a given value of the frequency of an alternating current circulating in the GMI-effect electrically-conductive material, then
   c) after a time period during which the device might have undergone an attack by electromagnetic waves, measuring a second value of the impedance of the attack detection element by circulating in the GMI-effect electrically-conductive material an alternating current with a frequency equal to said given value,
   d) comparing the first and second values of the impedance of the attack detection element, the device being considered as having undergone an attack by electromagnetic waves when the first and second values of the impedance of the attack detection element are significantly different from each other.

2. The method according to claim 1, wherein step a) is implemented by circulating in the GMI-effect electrically-conductive material an alternating excitation current whose amplitude progressively decreases over time or by subjecting the GMI-effect electrically-conductive material to a magnetic excitation field whose amplitude progressively decreases over time, until the value of the remanent magnetisation of the GMI-effect electrically-conductive material is equal to said predefined value.

3. The method according to claim 1, wherein the predefined value is equal to the value of the minimum remanent magnetisation of the GMI-effect electrically-conductive material.

4. The method according to claim 1, wherein the predefined value is higher than the value of the minimum remanent magnetisation of the GMI-effect electrically-conductive material.

5. The method according to claim 1, wherein the GMI-effect electrically-conductive material is a soft ferromagnetic material.

6. The method according to claim 1, wherein the attack detection element forms a sensor located at a portion of a face of the device.

7. The method according to claim 6, wherein the device further includes at least one element for protecting said face of the device, said protective element being disposed in the device and comprising at least one other GMI-effect electrically-conductive material portion extending, in a plane parallel to said face of the device, according to at least one serpentine and/or spiral like pattern.

8. The method according to claim 1, wherein the device further includes at least one second attach detection element of the device comprising at least one second GMI-effect electrically-conductive material, and wherein steps a), b), c) and d) of the method are also implemented for the second attack detection element.

9. The method according to claim 1, wherein first and second attack detection elements are disposed over a face of the device.

* * * * *